United States Patent [19]

Kuikka

[11] Patent Number: 4,981,207

[45] Date of Patent: Jan. 1, 1991

[54] TRACKS FOR CONVEYOR SYSTEMS

[75] Inventor: George Kuikka, Watford, England

[73] Assignee: George Kuikka Limited, Watford, England

[21] Appl. No.: 384,250

[22] Filed: Jul. 24, 1989

[51] Int. Cl.$^5$ .............................................. B65G 19/28
[52] U.S. Cl. .............................. 198/735.300; 198/841; 198/803.010; 198/860.300
[58] Field of Search .................. 198/735, 803.01, 841, 198/860.2, 860.3, 861.1; 199/735.3

[56] References Cited

U.S. PATENT DOCUMENTS

| | | | |
|---|---|---|---|
| 3,605,994 | 9/1971 | Parlette | 198/861.1 |
| 3,779,368 | 12/1973 | Smith | 198/841 |
| 4,013,167 | 3/1977 | Bourgeois | 198/841 |
| 4,605,121 | 8/1986 | Wahren | 198/803.01 |
| 4,718,349 | 1/1988 | Wahren | 198/803.01 |
| 4,742,905 | 5/1988 | Beers | 198/841 |

*Primary Examiner*—Joseph E. Valenza
*Attorney, Agent, or Firm*—Renner, Otto, Boisselle & Sklar

[57] ABSTRACT

In a conveyor system, there is provided a track having a channel which guides a flexible conveyor chain. The track is made up of a pair of longitudinally-extending extrusions. These extrusions provide a deck at each side of the conveyor track. The two extrusions may be identical and assembled in mirror image relationship. A return run of the conveyor track may be fixed beneath the working run to improve rigidity. The invention permits simplicity of installation and ease of maintenance.

11 Claims, 3 Drawing Sheets

TRACKS FOR CONVEYOR SYSTEMS

FIELD OF THE INVENTION

This invention relates to an improved track for a conveyor system and to a conveyor including such a track.

BACKGROUND TO THE INVENTION AND PRIOR ART

Many kinds of conveyor system are known. Conveyor systems allowing automatic or semi-automatic assembly at a series of sequentially arranged work stations are widely used in manufacturing plants. Examples of conveyor systems may be seen in French Patent Specification No. 2235068 and in U.K. Patent Specification Nos. 1,371,454 and 1,451,464. Examples of systems particularly intended for connecting work stations may be seen in U.K. Patent Specification Nos. 1,313,755 and 2,010,138, U.S. Pat. No. 3,650,373 and European Published Applications Nos. 163,617 and 203,898.

One disadvantage of many known systems is that the structure which supports and guides a conveyor element (which may be a conventional chain, or a belt, or continuous flexible chain made up of interconnected plastics elements) is not readily adapted to a chain or belt of different dimensions. Hence extensive reconstruction is normally necessary if it is required to use a different conveyor element, for example because a heavier workpiece is to be moved through a plurality of work stations in sequence.

SUMMARY OF THE INVENTION

According to one aspect of the invention a conveyor track comprises two substantially parallel elongate extrusions which are identical and assembled in mirror image relationship, each extrusion having a longitudinally extending recess therein for receiving joining clips or clamps which serve to maintain a precise distance between the extrusions.

Preferably, the conveyor track includes a conveyor working run and a conveyor return run, these runs being rigidly connected together at longitudinally-spaced locations.

According to a second aspect of the invention a conveyor track having is made up from end-to-end assembled metal extrusions, each extrusion forming an upper run of the track and having a longitudinal recess in its undersurface, in which the recesses are dimensioned and positioned to receive the respective ends of transversely-located joining clamps or clips which serve to maintain the two extrusions a precise distance apart.

According to a third aspect of the invention, there is provided a conveyor track for guiding a conveyor chain, the track having a chain-guiding channel, defined by a pair of symmetrical extrusions, and characterised by a deck portion which is substantially horizontal on either side thereof, and a wall portion extending downwardly from each deck portion.

OTHER EMBODIMENTS AND ADVANTAGES OF THE INVENTION

The track for a conveyor system particularly disclosed and illustrated herein has a pair of longitudinally-extending extrusions each having a first portion which forms a deck at one side of the conveyor track and a second portion which in conjunction with the second portion of the other extrusion defines a channel within which runs, in operation, a conveyor chain. The said second portions are preferably slightly spaced from one another so that a slot is provided in the base of the channel. This allows ready escape of dirt, dust, swarf, coolant, lubricant, nuts, bolts, loose parts being assembled, etc., and reduces the possibility of motion of the conveyor chain being impeded by undesired or misplaced materials of this kind. A particular advantage of this arrangement is that by locating the two extrusions either nearer together or further apart, the channel can be adjusted in width for narrower or wider conveyor chains.

According to a preferred embodiment of the invention, there is provided a conveyor track for an endless conveyor chain, the track having a first run extending through a plurality of work stations and a second (or return) run extending beneath the first. In such an arrangement, the return run includes an extrusion having one or more of the following features:-

(a) a substantially enclosed space within which the chain runs in use;

(b) a trough or tray located below the first run and serving as a gutter to collect liquid falling through a slot in the base of the channel of the first run;

(c) one or more trunking passageways for the reception of electrical wiring or cables; and (d) one or more T-slots in the outside of one or more of the side walls which define a chain-containing space, said T-slots being dimensioned to receive rhombic nuts whereby sensors, display devices, switches or control or other equipment can be readily fitted to and removed from the return run of the track.

The return run of the track may be bolted or otherwise fixed at regular intervals to the first run, so increasing the strength and stiffness of both the first and the return runs of the track. An advantage of having an enclosed return track is that the safety of the assembly workers is increased. An advantage of the provision of the T-slots described is that display devices, switches, etc may be easily fixed and removed at any desired position along the length of the track, and the presence closely adjacent to the T-slots of a trunking passageway means that the necessary wiring connected to such items can be installed without the need to provide custom-built electrical conduit.

According to a further aspect of the present invention, there is provided a conveyor track having a channel for guiding a serpentine conveyor chain characterised by clamping members connecting and determining the spacing of extrusions defining the channel, the clamping members being slotted to permit interengagement and having hooked ends engaging respective grooves in the undersides of the extrusions.

The advantage of wear strips located in each side deck is that wear on the deck portions themselves is reduced, and that it is a much quicker, simpler, and cheaper operation to replace a worn strip than to replace a worn deck portion. Hence a conveyor system may be more economically maintained in good operating condition.

BRIEF DESCRIPTION OF THE DRAWINGS

The invention will be better understood from the following non-limiting description of examples thereof given with reference to the accompanying drawings in which.

SPECIFIC DESCRIPTION OF AN EMBODIMENT OF THE INVENTION

Figure 1:
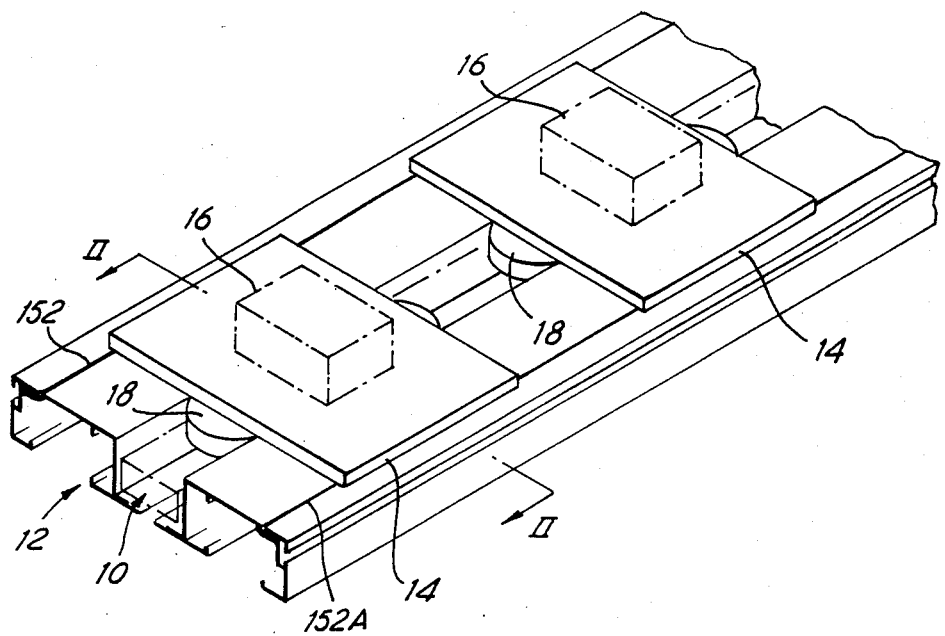
FIG. 1 is a perspective and diagrammatic view of an example of a first run of a conveyor track in accordance with the present invention.

Referring firstly to FIG. 1, the conveyor system, only part of the working (first) run of which is shown, includes a conveyor chain 10 made up of interconnected plastics elements. Such conveyor chains are known and one example is that sometimes known as the "serpentine chain" available from Reynolds of Manchester, or Ewarts of Derby under the name "1700 Series" or from Rexnord of Milwaukee, Wis., U.S.A. under the name of "Rexnord Multiflex 1700". The chain 10 is guided in a track 12 and has attached to it a series of pallets 14 each of which carries a workpiece 16. The workpieces are operated upon e.g. machined, or further parts are assembled thereto, at a series of work stations (not shown) spaced along the length of the conveyor. A support block 18 for each pallet is attached to the chain 10 and the pallet is carried by its support block. The height of each support block is such that the undersides of the pallet just clears deck portions 122, 124 of the track 12. As will be apparent, FIG. 1 first shows the first (working) run of track. The chain 10 is an endless loop and may be driven in any known manner. The return run of the chain 10 is guided by a return run 20 of track (FIGS. 2 and 3) formed by a series of end-to-end extrusions whose construction can be seen in FIG. 3. The conveyor system also includes a longitudinally-extending cable trunking 30 (FIGS. 2 and 4) which may be located beneath the return run 20. At intervals along the length of the conveyor, these parts (12, 20, 30) are supported by structures which may include vertical posts 40 and cross beams 42 and 44.

Figure 3:
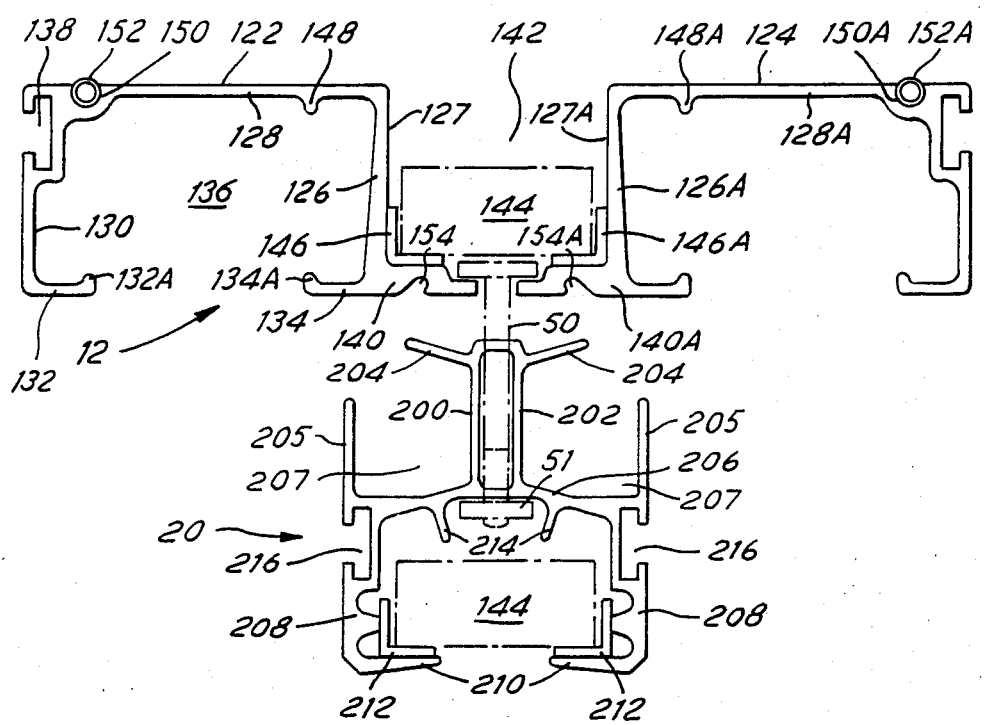
FIG. 3 is a more detailed vertical cross-section showing extrusions two of which form a length of the first run and the third of which forms a length of the return run of a conveyor track according to the invention.

Referring now to FIG. 3, one embodiment of conveyor track (working run) and one example of return run are shown. As illustrated, the return run 20 is located directly below the first run and the run 12 and run 20 may be joined together by a series of bolts along the length of the track, one such bolt being illustrated at 50. In this way, enhanced stiffness of the conveyor track can be achieved and, as a consequence, a greater longitudinal spacing between adjacent support structures 40, 42, 44, can be used. This saves material and simplifies installation. The illustrated conveyor first run is made up, according to this embodiment of the invention, using two identical extrusions disposed in mirror image relationship. The extrusions are preferably of aluminium or aluminium alloy but in certain circumstances could alternatively be of a suitable plastics material. The left hand extrusion is shown at 122 and the right hand extrusion at 124. As they are identical, only the extrusion 122 will be described in detail. The use of two identical extrusions is advantageous because the cost of manufacture may be reduced. The extrusion 122 comprises an inner wall 126, a top deck 128, and an outer wall 130. Flanges 132 and 134 extend inwardly respectively from walls 130 and 126 so defining a recess 136 which accommodates actuating cylinders (not shown) for stop mechanisms which are placed at intervals along the length of the conveyor track. Such stop mechanisms are known per se, and are employed to stop the workpieces 16 at desired positions so that manufacturing or assembly operations can be carried out. As the nature of the stop mechanisms forms no part of the novelty of the present invention, they will not be further described. It is important to note, however, that in the interest of saving material, the width of the deck 122 and the height of the walls 126, 130 are chosen to have substantially the minimum values which will allow the desired actuating cylinder to be accommodated wholly within the recess 136.

A key slot 138 extends the whole longitudinal extent of the outer wall 130. This is provided to receive one or more rhombic nuts which can be fixed therein securely merely by rotating through approximately 90°. Once so fixed, they allow the attachment at any desired place along the length of the conveyor track of ancilliary equipment such as sensors, display devices, or other electrical equipment. Rhombic nuts are known per se and hence their use need not be further described. The inner wall 126 is made integral with a base wall 140 which together with its counterpart 140A of the extrusion 124 constitutes the base of a channel 142. Within this channel 142 runs a serpentine chain 144 of the kind described above. To minimise wear on the base 140 and the walls 126, 126A, mild steel members which are L-shaped in cross-section, and which are shown at 146, 146A, extend the length of the conveyor channel 142.

To provide enhanced longitudinal stiffness and to serve as a positioning stop for the actuating cylinders, the deck portions 128, 128A have respective ribs 148, 148A extending downwardly into the relevant recess. Ribs 132SA, 134A on the wall flanges 132, 134 also serve to stiffen the extrusion and to help locate air cylinders, etc.

The respective deck portions 128 and 128A have longitudinal grooves 150, 150A therein. The purpose of these grooves is to accommodate respective wear strips 152, 152A which can provide support for the undersurface of a pallet being transported by the chain 144. In this way wear on the upper surface of the deck portions 122, 124 is minimised.

The undersurfaces of the base walls 140, 140A each have a recess, 154 and 154A respectively, whose function is to receive the end of a clamp 500 (FIGS. 5 & 6) utilized to obtain and maintain an appropriate fixed spacing distance between the inner surfaces of the walls 126, 126A, so defining a fixed width channel 142. As a less-preferred alternative, any suitable known clip can be used. By utilizing clamps 500 of different lengths, and making no other changes, the same extusions can be employed to provide a conveyor channel 142 of different width. This may be appropriate if a heavy-duty or light-duty conveyor chain 144 was required.

The return run 20 is a single extrusion of aluminium alloy or in certain cases plastics material, and this extrusion includes upstanding walls 200, 202, which may if desired be grooved (not shown) to receive a threaded or selftapping bolt 50. As illustrated, a nut 51 cooperates with the bolt 50 to hold the track 12 and the return run 20 together. The return run has upper marginal walls 205 which define, together with the walls 200, 202, respective longitudinal trunking recesses 207, for accommodating control cabling or wiring or pneumatic lines for supplying air under pressure. It is a feature of the embodiment specifically disclosed herein that ample provision is made for longitudinal cabling and wiring so rendering the construction of custom built conveyor systems more economical than hitherto. That is, separate design, manufacture and installation of such supply lines and conduit for same is largely avoided. The upper ends of these walls 200, 202 carry outwardly extending flanges 204 which together consitute a drip tray located beneath the longitudinal slit located between the inner margins of the base walls 140, 140A. The extrusion 20 has a cross wall 206, side walls 208, and inwardly extending flanges 210. The walls 208 and 210 support L-shaped steel members 212 which are similar in construction and function to the members 146, 146A. To limit any upward jumping or movement of the return run of the conveyor 144, and to prevent irregularities in the upper surface of the conveyor snagging on the bolt 50 or the nut 51, the cross wall 206 has continuous downwardly projecting ribs 214. These are continuous throughout the length of the extrusion 20. The walls 208 have T-slots 216 to provide further possible locations for the attachment (using rhombic nuts) of any desired equipment, such as monitoring, sensing or display devices.

Figure 2:
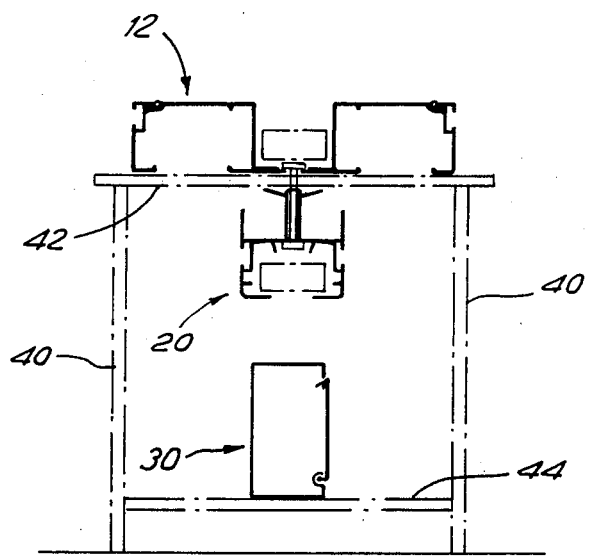
FIG. 2 is a diagrammatic view taken in vertical section of one example of a conveyor system according to the invention, such a system may include a conveyor track as shown in FIG. 3.
Figure 4:
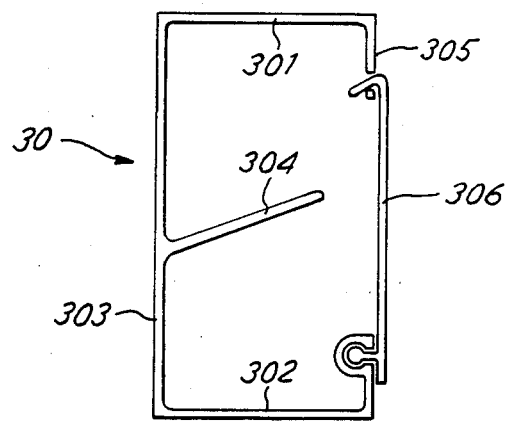
FIG. 4 illustrates an extrusion defining cable trunking for power cables and control wiring for a conveyor system as shown in FIG. 2.

FIG. 4 illustrates cable trunking which may be installed to extend longitudinally beneath the return run 20 as seen in FIG. 2. The cable trunking includes top and bottom walls 301, 302, a rear wall 303 supporting a shelf 304, and a front wall 305 which carries removable doors or cover plates one of which is shown at 306. This shelf 304 is provided to divide the cable trunking into two longitudinally-extending spaces, one of which accommodates power cables and the other of which accommodates control wiring. A series of removable doors 306 are provided along the length of the cable trunking 30. In this way, access can be readily obtained to the interior at any desired position along the length of the trunking.

Figure 5:
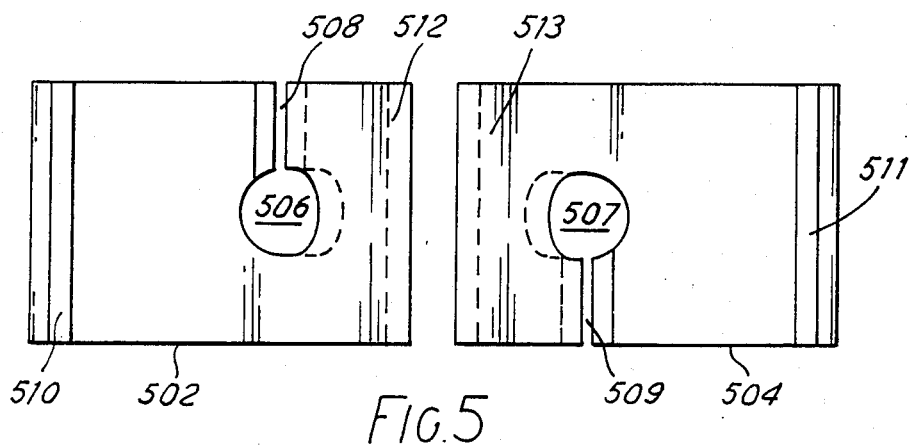
FIG. 5 is a plan view of a pair of clamping members which together make up a clamp for holding two extrusions firmly together at a precisely defined and maintained spacing.
Figure 6:
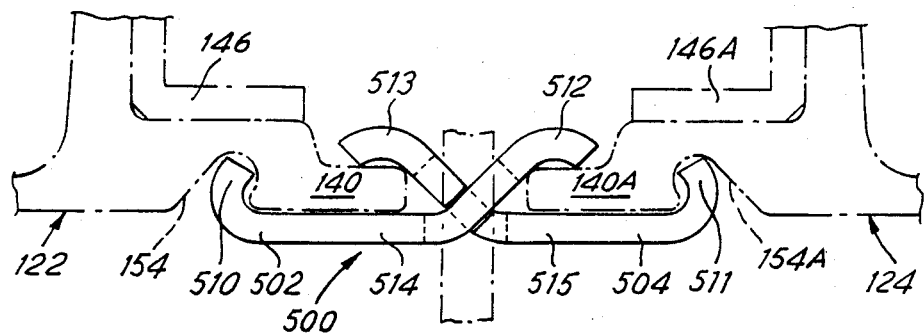
FIG. 6 is a cross-sectional view of an assembled and installed clamp of the kind shown in FIG. 5, illustrating its cooperation with respective grooves in the underside of each extrusion.

FIG. 5 illustrates a pair of clamping members 502, 504 which together make up a clamp 500 (FIG. 6). The members are identical and may be made as metal stampings. Each member has a central hole 506, 507 joined to one edge by respective slots 508, 509. In use, one of the bolts 50 passes through the substantially aligned holes 506, 507 or alternatively for clamps at different positions along the length of the track, a shorter bolt with cooperating nut fixes the two clamping members together. The slots 508, 509 allow the two clamping members to be slid together and taken apart once the bolt through the holes 506, 507 is removed. Each clamping member has a hook (510 and 511) at its free end which is received by the grooves 154, 154A. The hooks and their engagement in the grooves 154, 154A limits the possible separation of the extrusions 122 and 124. Each clamp has a tab (521, 513) and a plate portion (514, 515). In use the tab portions are arranged to overlie the respective edge regions of the two extrusions and as the bolt through the holes 506, 507 is tightened, exert a clamping action on each extrusion.

It will be seen that these clamps can be easily assembled and disassembled, do not have different parts which may get lost, and give a secure fixing which prevents uneven spacing between the two extrusions which together define a conveyor track. Moreover, the clamps are inexpensive to manufacture. By using clamping members having different lengths, that is to say, different spacings between the slot 506 and the hook end 510, different widths of conveyor channel 142 can readily be obtained. To the best of Applicant's knowledge and belief, all previously available conveyor tracks have required either cumbersome adjustments or entire re-construction if it was desired to employ a wider or a narrower conveyor channel than that originally installed. Hence it will be seen that the ease of assembly and installation afforded by the measures described above are important advantageous features of the invention.

It will be seen that the invention is based on the concept of providing a conveyor track in two parts and that preferably each such part is an extrusion and the two parts are identical, assembled in mirror image relationship. The invention viewed from another aspect embodies the concept of obtaining improved rigidity by connecting together at longitudinally-spaced locations a conveyor working run and a conveyor return run, preferably one above the other.

The invention viewed from a further aspect provides a conveyor track having deck portions which are provided with wear strips. The invention also embodies the concept of providing longitudinal spaces within the return run structure for the reception of cabling, wiring, pneumatic lines, etc., as needed.

While one particular embodiment of the present invention has been described and illustrated, it will be appreciated that modifications may be made without departing from the invention. For example, while wear strips of substantially circular cross-section have been shown, it will be appreciated that wear strips of different cross sectional shape, accommodated in complementary longitudinal grooves, could equally well be employed. While recesses 154, 154A have been shown to receive the spacer clamps, other methods could be employed of achieving the desired end result, namely an accurate and uniform spacing between the internal surfaces of the walls defining the chain-receiving channel.

In this specification including its claims, the word "chain" is not limited to chains made of metal and is intended to cover, inter alia, chains made from interconnected plastics elements.

I claim:

1. A conveyor track comprising two substantially parallel elongate extrusions which are identical and assembled in mirror image relationship, each extrusion having a longitudinally extending recess therein for receiving joining clamp means which serve to maintain a precise distance between the extrusions; said track being constituted by a conveyor working run and a conveyor return run, these runs being rigidly connected together at longitudinally-spaced locations; and wherein each extrusion has a first portion which forms a deck at one side of the track and a second portion which in conjunction with the second portion of the other extrusion defines a channel having a base disposed below the surface of said deck, said channel being arranged to receive a conveyor chain of the serpentine type.

2. A conveyor track for guiding a serpentine conveyor chain and made up from pairs of metal extrusions assembled end-to-end, each extrusion forming part of an upper run of the track and having a longitudinal recess in its undersurface, the recesses in the two extrusions of each said pair thereof being dimensioned and positioned to receive respective ends of transversely-located joining clamps or clips which serve to maintain the two extrusions a precise distance apart, said upper run extending through a plurality of work stations and said track including a return run extending beneath the upper run, wherein said return run includes an extrusion having one or more of the following features:
   (a) walls defining a substantially enclosed space within which the chain runs in use;
   (b) a trough means located below the upper run and serving as a gutter to collect liquid falling through a slot in the base of a channel in the upper run;
   (c) at least one trunking passageway for the reception of electrical wiring or cables; and
   (d) at least one T-slot in the outside of a side wall of said return run, said side wall together with another side wall defining a chain-containing space, said T-slots being dimensioned to receive rhombic nuts whereby sensors, display devices, switches or control or other equipment can be readily fitted to and removed from the return run of the track.

3. A conveyor track for guiding a conveyor chain of the serpentine type, the track comprising a pair of symmetrical extrusions defining therebetween a chain-guiding channel, said extrusions having respective deck portions which are substantially horizontal on either side of said channel, and a wall portion extending downwardly from each said deck portion on the side thereof remote from said channel, said channel having a base formed by a respective substantially horizontal portion of the two extrusions, said horizontal portions being located below the surface of the said deck portions.

4. A conveyor track according to claim 3 wherein each said deck portion has a longitudinally extending groove therein for receiving a wear strip.

5. A conveyor track according to claim 2 wherein a wall portion of at least one of said upper run extrusions has therein a T-slot for receiving a rhombic nut whereby control, monitoring, or display equipment can readily be fixed to and removed from the track.

6. A track according to claim 2 in which said two extrusions are identical in cross-sectional shape.

7. A track according to claim 1 wherein each deck portion has a groove for containing a wear strip.

8. A conveyor track having a channel for guiding a serpentine conveyor chain characterised by clamping members connecting and determining the spacing of extrusions defining the channel, the clamping members being slotted to permit interengagement and having hooked ends engaging respective grooves in the undersides of the extrusions.

9. A conveyor track comprising two substantially parallel elongate extrusions which are identical and assembled in mirror image relationship, each extrusion having a longitudinally extending recess therein for receiving joining clamp means which serve to maintain a precise distance between the extrusions, said clamp means connecting and determining the spacing of said extrusions; said extrusions defining a conveyor-receiving channel; and the said clamp means being slotted to permit interengagement and having hooked ends engaging respective grooves in the underside of the said extrusions.

10. A track according to claim 3 in which said extrusions are identical in cross-sectional shape.

11. A track according to claim 3 wherein each said wall portion has therein a T-slot for receiving a rhombic nut.

* * * * *